US009954899B2

(12) United States Patent
Chen et al.

(10) Patent No.: US 9,954,899 B2
(45) Date of Patent: *Apr. 24, 2018

(54) APPLYING A NETWORK TRAFFIC POLICY TO AN APPLICATION SESSION

(71) Applicant: A10 Networks, Inc., San Jose, CA (US)

(72) Inventors: Lee Chen, Saratoga, CA (US); Dennis Oshiba, Fremont, CA (US); John Chiong, San Jose, CA (US)

(73) Assignee: A10 NETWORKS, INC., San Jose, CA (US)

( * ) Notice: Subject to any disclaimer, the term of this patent is extended or adjusted under 35 U.S.C. 154(b) by 29 days.

This patent is subject to a terminal disclaimer.

(21) Appl. No.: 15/157,357

(22) Filed: May 17, 2016

(65) Prior Publication Data

US 2016/0261642 A1   Sep. 8, 2016

Related U.S. Application Data

(63) Continuation of application No. 14/973,675, filed on Dec. 17, 2015, now Pat. No. 9,356,910, which is a
(Continued)

(51) Int. Cl.
*H04L 29/06* (2006.01)
*H04L 29/08* (2006.01)
(Continued)

(52) U.S. Cl.
CPC ............ *H04L 63/20* (2013.01); *H04L 45/308* (2013.01); *H04L 63/029* (2013.01);
(Continued)

(58) Field of Classification Search
CPC ......... H04L 63/20; H04L 67/22; H04L 51/04; H04L 67/10; H04L 63/02; H04L 65/1026;
(Continued)

(56) References Cited

U.S. PATENT DOCUMENTS 4,403,286 A    9/1983  Fry et al.
4,495,570 A    1/1985  Kitajima et al.
(Continued)

FOREIGN PATENT DOCUMENTS

CN    1725702 A    1/2006
CN    101094225 A   12/2007
(Continued)

OTHER PUBLICATIONS

Cardellini, et al., "Dynamic Load Balancing on Web-Server Systems", IEEE Internet Computing, 1999, vol. 3(3), pp. 28-29.
(Continued)

*Primary Examiner* — Carl Colin
*Assistant Examiner* — Gary Lavelle
(74) *Attorney, Agent, or Firm* — AMPACC Law Group, LLP; Keith Kline

(57) ABSTRACT

Embodiments of the present technology relate to a method for applying a security policy to an application session, comprising: determining, by a security gateway, a first user identity and a second user identity from a data packet for an application session; obtaining, by the security gateway, a security policy for the application session; and applying the security policy to the application session by the security gateway. The user identity may be a network user identity or an application user identity recognized from packets of the application session. The security policy may comprise a network traffic policy mapped and/or a document access policy mapped to the user identity, where the network traffic policy is applied to the application session. The security gateway may further generate a security report concerning the application of the security policy to the application session.

17 Claims, 13 Drawing Sheets

Related U.S. Application Data continuation of application No. 14/323,920, filed on Jul. 3, 2014, now Pat. No. 9,253,152, which is a continuation of application No. 14/061,722, filed on Oct. 23, 2013, now Pat. No. 8,826,372, which is a continuation of application No. 13/716,124, filed on Dec. 15, 2012, now Pat. No. 8,584,199, which is a continuation-in-part of application No. 13/650,179, filed on Oct. 12, 2012, now Pat. No. 8,595,791, which is a continuation of application No. 12/788,339, filed on May 27, 2010, now Pat. No. 8,312,507, which is a continuation-in-part of application No. 12/771,491, filed on Apr. 30, 2010, now Pat. No. 7,979,585, which is a continuation of application No. 11/582,613, filed on Oct. 17, 2006, now Pat. No. 7,716,378.

(51) Int. Cl.
| | | |
|---|---|---|
| *H04L 12/725* | (2013.01) | |
| *H04L 29/12* | (2006.01) | |
| *G06F 21/00* | (2013.01) | |
| *H04L 12/58* | (2006.01) | |
| *H04M 1/725* | (2006.01) | |
| *H04W 12/00* | (2009.01) | |

(52) U.S. Cl.
CPC ...... *H04L 63/0227* (2013.01); *H04L 63/0236* (2013.01); *H04L 63/08* (2013.01); *H04L 67/02* (2013.01); *H04L 67/06* (2013.01); *H04L 67/14* (2013.01); *G06F 21/00* (2013.01); *H04L 51/04* (2013.01); *H04L 61/20* (2013.01); *H04L 61/2596* (2013.01); *H04L 61/3065* (2013.01); *H04L 63/02* (2013.01); *H04L 63/0407* (2013.01); *H04L 63/0892* (2013.01); *H04L 65/1026* (2013.01); *H04L 67/10* (2013.01); *H04L 67/22* (2013.01); *H04L 67/306* (2013.01); *H04L 67/42* (2013.01); *H04L 69/22* (2013.01); *H04M 1/72547* (2013.01); *H04W 12/00* (2013.01)

(58) Field of Classification Search
CPC ... H04L 63/0407; H04L 67/42; H04L 67/306; H04W 12/00; H04M 1/72547; G06F 21/00
See application file for complete search history.

(56) References Cited

U.S. PATENT DOCUMENTS

| | | |
|---|---|---|
| 4,577,272 A | 3/1986 | Ballew et al. |
| 4,720,850 A | 1/1988 | Oberlander et al. |
| 4,864,492 A | 9/1989 | Blakely-Fogel et al. |
| 4,882,699 A | 11/1989 | Evensen |
| 5,031,089 A | 7/1991 | Liu et al. |
| 5,218,676 A | 6/1993 | Ben-Ayed et al. |
| 5,293,488 A | 3/1994 | Riley et al. |
| 5,341,477 A | 8/1994 | Pitkin et al. |
| 5,432,908 A | 7/1995 | Heddes et al. |
| 5,537,542 A | 7/1996 | Eilert et al. |
| 5,563,878 A | 10/1996 | Blakeley et al. |
| 5,603,029 A | 2/1997 | Aman et al. |
| 5,675,739 A | 10/1997 | Eilert et al. |
| 5,740,371 A | 4/1998 | Wallis |
| 5,751,971 A | 5/1998 | Dobbins et al. |
| 5,754,752 A | 5/1998 | Sheh et al. |
| 5,774,660 A | 6/1998 | Brendel et al. |
| 5,774,668 A | 6/1998 | Choquier et al. |
| 5,796,936 A | 8/1998 | Watabe et al. |
| 5,812,771 A | 9/1998 | Fee et al. |
| 5,828,847 A | 10/1998 | Gehr et al. |
| 5,835,724 A | 11/1998 | Smith |
| 5,867,636 A | 2/1999 | Walker |
| 5,867,661 A | 2/1999 | Bittinger et al. |
| 5,875,296 A | 2/1999 | Shi et al. |
| 5,917,997 A | 6/1999 | Bell et al. |
| 5,918,017 A | 6/1999 | Attanasio et al. |
| 5,923,854 A | 7/1999 | Bell et al. |
| 5,931,914 A | 8/1999 | Chiu |
| 5,935,207 A | 8/1999 | Logue et al. |
| 5,935,215 A | 8/1999 | Bell et al. |
| 5,941,988 A | 8/1999 | Bhagwat et al. |
| 5,944,794 A | 8/1999 | Okamoto et al. |
| 5,946,686 A | 8/1999 | Schmuck et al. |
| 5,951,650 A | 9/1999 | Bell et al. |
| 5,951,694 A | 9/1999 | Choquier et al. |
| 6,006,264 A | 12/1999 | Colby et al. |
| 6,006,269 A | 12/1999 | Phaal |
| 6,031,978 A | 2/2000 | Cotner et al. |
| 6,041,357 A | 3/2000 | Kunzelman et al. |
| 6,076,108 A | 6/2000 | Courts et al. |
| 6,088,728 A | 7/2000 | Bellemore et al. |
| 6,098,093 A | 8/2000 | Bayeh et al. |
| 6,104,717 A | 8/2000 | Coile et al. |
| 6,119,174 A | 9/2000 | Borowsky et al. |
| 6,128,279 A | 10/2000 | O'Neil et al. |
| 6,141,759 A | 10/2000 | Braddy |
| 6,185,598 B1 | 2/2001 | Farber et al. |
| 6,223,205 B1 | 4/2001 | Harchol-Balter et al. |
| 6,223,287 B1 | 4/2001 | Douglas et al. |
| 6,247,057 B1 | 6/2001 | Barrera, III |
| 6,249,820 B1 | 6/2001 | Dobbins et al. |
| 6,252,878 B1 | 6/2001 | Locklear, Jr. et al. |
| 6,262,976 B1 | 7/2001 | McNamara |
| 6,286,039 B1 | 9/2001 | Van Horne et al. |
| 6,314,463 B1 | 11/2001 | Abbott et al. |
| 6,317,786 B1 | 11/2001 | Yamane et al. |
| 6,324,177 B1 | 11/2001 | Howes et al. |
| 6,330,560 B1 | 12/2001 | Harrison et al. |
| 6,339,423 B1 | 1/2002 | Sampson et al. |
| 6,353,614 B1 | 3/2002 | Borella et al. |
| 6,363,075 B1 | 3/2002 | Huang et al. |
| 6,363,081 B1 | 3/2002 | Gase |
| 6,374,300 B2 | 4/2002 | Masters |
| 6,374,359 B1 | 4/2002 | Shrader et al. |
| 6,381,632 B1 | 4/2002 | Lowell |
| 6,393,475 B1 | 5/2002 | Leong et al. |
| 6,397,261 B1 | 5/2002 | Eldridge et al. |
| 6,430,622 B1 | 8/2002 | Aiken, Jr. et al. |
| 6,445,704 B1 | 9/2002 | Howes et al. |
| 6,446,225 B1 | 9/2002 | Robsman et al. |
| 6,490,682 B2 | 12/2002 | Vanstone et al. |
| 6,496,866 B2 | 12/2002 | Attanasio et al. |
| 6,510,464 B1 | 1/2003 | Grantges, Jr. et al. |
| 6,515,988 B1 | 2/2003 | Eldridge et al. |
| 6,542,926 B2 | 4/2003 | Zalewski et al. |
| 6,564,215 B1 | 5/2003 | Hsiao et al. |
| 6,567,857 B1 | 5/2003 | Gupta et al. |
| 6,578,066 B1 | 6/2003 | Logan et al. |
| 6,587,866 B1 | 7/2003 | Modi et al. |
| 6,591,262 B1 | 7/2003 | MacLellan et al. |
| 6,594,268 B1 | 7/2003 | Aukia et al. |
| 6,598,167 B2 | 7/2003 | Devine et al. |
| 6,606,315 B1 | 8/2003 | Albert et al. |
| 6,609,150 B2 | 8/2003 | Lee et al. |
| 6,611,498 B1 | 8/2003 | Baker et al. |
| 6,650,641 B1 | 11/2003 | Albert et al. |
| 6,657,974 B1 | 12/2003 | Britton et al. |
| 6,697,354 B1 | 2/2004 | Borella et al. |
| 6,701,377 B2 | 3/2004 | Burmann et al. |
| 6,704,317 B1 | 3/2004 | Dobson |
| 6,711,618 B1 | 3/2004 | Danner et al. |
| 6,714,979 B1 | 3/2004 | Brandt et al. |
| 6,718,383 B1 | 4/2004 | Hebert |
| 6,742,126 B1 | 5/2004 | Mann et al. |
| 6,745,229 B1 | 6/2004 | Gobin et al. |
| 6,748,413 B1 | 6/2004 | Boumas |
| 6,760,758 B1 | 7/2004 | Lund et al. |
| 6,763,370 B1 | 7/2004 | Schmeidler et al. |
| 6,763,468 B2 | 7/2004 | Gupta et al. |
| 6,772,333 B1 | 8/2004 | Brendel |

(56) References Cited

U.S. PATENT DOCUMENTS

| | | |
|---|---|---|
| 6,779,017 B1 | 8/2004 | Lamberton et al. |
| 6,877,095 B1 | 4/2005 | Allen |
| 6,886,044 B1 | 4/2005 | Miles et al. |
| 6,892,307 B1 | 5/2005 | Wood et al. |
| 6,941,384 B1 | 9/2005 | Aiken, Jr. et al. |
| 6,952,728 B1 | 10/2005 | Alles et al. |
| 6,954,784 B2 | 10/2005 | Aiken, Jr. et al. |
| 6,963,917 B1 | 11/2005 | Callis et al. |
| 6,965,930 B1 | 11/2005 | Arrowood et al. |
| 6,996,617 B1 | 2/2006 | Aiken, Jr. et al. |
| 6,996,631 B1 | 2/2006 | Aiken, Jr. et al. |
| 7,058,600 B1 | 6/2006 | Combar et al. |
| 7,058,789 B2 | 6/2006 | Henderson et al. |
| 7,120,697 B2 | 10/2006 | Aiken, Jr. et al. |
| 7,188,181 B1 | 3/2007 | Squier et al. |
| 7,225,249 B1 | 5/2007 | Barry et al. |
| 7,430,611 B2 | 9/2008 | Aiken, Jr. et al. |
| 7,463,648 B1 | 12/2008 | Eppstein et al. |
| 7,509,369 B1 | 3/2009 | Tormasov |
| 7,703,102 B1 | 4/2010 | Eppstein et al. |
| 7,792,113 B1 | 9/2010 | Foschiano et al. |
| 7,948,952 B2 | 5/2011 | Hurtta et al. |
| 7,970,934 B1 | 6/2011 | Patel |
| 7,991,859 B1 | 8/2011 | Miller et al. |
| 8,001,594 B2 * | 8/2011 | Heintz ............... H04L 63/0272 726/22 |
| 8,019,870 B1 | 9/2011 | Eppstein et al. |
| 8,032,634 B1 | 10/2011 | Eppstein et al. |
| 8,179,809 B1 | 5/2012 | Eppstein et al. |
| 8,191,106 B2 | 5/2012 | Choyi et al. |
| 8,224,971 B1 | 7/2012 | Miller et al. |
| 8,234,650 B1 | 7/2012 | Eppstein et al. |
| 8,239,445 B1 | 8/2012 | Gage et al. |
| 8,255,644 B2 | 8/2012 | Sonnier et al. |
| 8,296,434 B1 | 10/2012 | Miller et al. |
| 8,312,507 B2 | 11/2012 | Chen et al. |
| 8,543,644 B2 | 9/2013 | Gage et al. |
| 8,584,199 B1 | 11/2013 | Chen et al. |
| 8,595,791 B1 | 11/2013 | Chen et al. |
| 8,813,180 B1 | 8/2014 | Chen et al. |
| 8,826,372 B1 | 9/2014 | Chen et al. |
| 8,885,463 B1 | 11/2014 | Medved et al. |
| 9,118,618 B2 | 8/2015 | Davis |
| 9,118,620 B1 | 8/2015 | Davis |
| 9,219,751 B1 | 12/2015 | Chen et al. |
| 9,253,152 B1 | 2/2016 | Chen et al. |
| 9,270,705 B1 | 2/2016 | Chen et al. |
| 9,338,225 B2 | 5/2016 | Jalan et al. |
| 9,350,744 B2 | 5/2016 | Chen et al. |
| 9,356,910 B2 | 5/2016 | Chen et al. |
| 9,497,201 B2 | 11/2016 | Chen et al. |
| 9,544,364 B2 | 1/2017 | Jalan et al. |
| 2001/0015812 A1 | 8/2001 | Sugaya |
| 2002/0010783 A1 | 1/2002 | Primak et al. |
| 2002/0091831 A1 | 7/2002 | Johnson |
| 2002/0124089 A1 | 9/2002 | Aiken, Jr. et al. |
| 2002/0133491 A1 | 9/2002 | Sim et al. |
| 2002/0141448 A1 | 10/2002 | Matsunaga |
| 2002/0143953 A1 | 10/2002 | Aiken |
| 2002/0143954 A1 | 10/2002 | Aiken, Jr. et al. |
| 2002/0166080 A1 | 11/2002 | Attanasio et al. |
| 2002/0178265 A1 | 11/2002 | Aiken, Jr. et al. |
| 2002/0178268 A1 | 11/2002 | Aiken, Jr. et al. |
| 2002/0191575 A1 | 12/2002 | Kalavade et al. |
| 2002/0194335 A1 | 12/2002 | Maynard |
| 2002/0199000 A1 | 12/2002 | Banerjee |
| 2003/0023711 A1 | 1/2003 | Parmar et al. |
| 2003/0023873 A1 | 1/2003 | Ben-Itzhak |
| 2003/0031180 A1 | 2/2003 | Datta et al. |
| 2003/0035420 A1 | 2/2003 | Niu |
| 2003/0061402 A1 | 3/2003 | Yadav |
| 2003/0074579 A1 * | 4/2003 | Della-Libera ............ H04L 45/02 726/1 |
| 2003/0079146 A1 | 4/2003 | Burstein |
| 2003/0081624 A1 | 5/2003 | Aggarwal et al. |
| 2003/0105862 A1 * | 6/2003 | Villavicencio .......... H04L 63/08 709/225 |
| 2003/0131116 A1 * | 7/2003 | Jain ..................... H04L 12/5602 709/230 |
| 2003/0131245 A1 | 7/2003 | Linderman |
| 2003/0152078 A1 | 8/2003 | Henderson et al. |
| 2003/0154293 A1 * | 8/2003 | Zmolek ................. H04L 63/08 709/228 |
| 2003/0202536 A1 | 10/2003 | Foster et al. |
| 2004/0001497 A1 | 1/2004 | Sharma |
| 2004/0128312 A1 | 7/2004 | Shalabi et al. |
| 2004/0139057 A1 | 7/2004 | Hirata et al. |
| 2004/0139108 A1 | 7/2004 | Tang et al. |
| 2004/0141005 A1 | 7/2004 | Banatwala et al. |
| 2004/0143599 A1 | 7/2004 | Shalabi et al. |
| 2004/0184442 A1 | 9/2004 | Jones et al. |
| 2004/0210623 A1 | 10/2004 | Hydrie et al. |
| 2004/0253956 A1 | 12/2004 | Collins |
| 2005/0009520 A1 * | 1/2005 | Herrero ............ H04L 29/12188 455/435.1 |
| 2005/0021949 A1 | 1/2005 | Izawa et al. |
| 2005/0038881 A1 * | 2/2005 | Ben-Itzhak ............ G06F 21/55 709/223 |
| 2005/0071687 A1 * | 3/2005 | Pathakis ............. H04L 63/0407 726/19 |
| 2005/0125276 A1 | 6/2005 | Rusu |
| 2005/0141506 A1 | 6/2005 | Aiken, Jr. et al. |
| 2005/0249225 A1 | 11/2005 | Singhal |
| 2005/0259586 A1 | 11/2005 | Hafid et al. |
| 2006/0036733 A1 | 2/2006 | Fujimoto et al. |
| 2006/0056297 A1 * | 3/2006 | Bryson ................. H04L 63/104 370/230 |
| 2006/0064478 A1 | 3/2006 | Sirkin |
| 2006/0069804 A1 | 3/2006 | Miyake et al. |
| 2006/0077926 A1 | 4/2006 | Rune |
| 2006/0092950 A1 | 5/2006 | Arregoces et al. |
| 2006/0098645 A1 | 5/2006 | Walkin |
| 2006/0112170 A1 | 5/2006 | Sirkin |
| 2006/0190997 A1 | 8/2006 | Mahajani et al. |
| 2006/0209789 A1 | 9/2006 | Gupta et al. |
| 2006/0230129 A1 | 10/2006 | Swami et al. |
| 2007/0086382 A1 | 4/2007 | Narayanan et al. |
| 2007/0094396 A1 | 4/2007 | Takano et al. |
| 2007/0118881 A1 | 5/2007 | Mitchell et al. |
| 2007/0156919 A1 | 7/2007 | Potti et al. |
| 2007/0165622 A1 | 7/2007 | O'Rourke et al. |
| 2007/0259673 A1 | 11/2007 | Willars et al. |
| 2007/0274285 A1 | 11/2007 | Werber et al. |
| 2007/0286077 A1 | 12/2007 | Wu |
| 2007/0288247 A1 | 12/2007 | Mackay |
| 2007/0294209 A1 | 12/2007 | Strub et al. |
| 2008/0109870 A1 | 5/2008 | Sherlock et al. |
| 2008/0134332 A1 | 6/2008 | Keohane et al. |
| 2008/0162679 A1 | 7/2008 | Maher et al. |
| 2008/0263209 A1 | 10/2008 | Pisharody et al. |
| 2008/0271130 A1 | 10/2008 | Ramamoorthy |
| 2008/0320151 A1 | 12/2008 | McCanne et al. |
| 2009/0037361 A1 | 2/2009 | Prathaban et al. |
| 2009/0106830 A1 | 4/2009 | Maher |
| 2009/0141634 A1 | 6/2009 | Rothstein et al. |
| 2009/0213858 A1 | 8/2009 | Dolganow et al. |
| 2009/0262741 A1 | 10/2009 | Jungck et al. |
| 2009/0271472 A1 | 10/2009 | Scheifler et al. |
| 2009/0313379 A1 | 12/2009 | Rydnell et al. |
| 2010/0162378 A1 | 6/2010 | Jayawardena et al. |
| 2010/0188975 A1 | 7/2010 | Raleigh |
| 2010/0235880 A1 | 9/2010 | Chen et al. |
| 2010/0312740 A1 | 12/2010 | Clemm et al. |
| 2011/0013525 A1 | 1/2011 | Breslau et al. |
| 2011/0064083 A1 | 3/2011 | Borkenhagen et al. |
| 2011/0099403 A1 | 4/2011 | Miyata et al. |
| 2011/0110294 A1 | 5/2011 | Valluri et al. |
| 2011/0153834 A1 | 6/2011 | Bharrat |
| 2011/0185073 A1 | 7/2011 | Jagadeeswaran et al. |
| 2011/0276695 A1 | 11/2011 | Maldaner |
| 2011/0292939 A1 | 12/2011 | Subramaian et al. |
| 2012/0023231 A1 | 1/2012 | Ueno |
| 2012/0066371 A1 | 3/2012 | Patel et al. |
| 2012/0084460 A1 | 4/2012 | McGinnity et al. |

(56) References Cited

U.S. PATENT DOCUMENTS

| | | |
|---|---|---|
| 2012/0117571 A1 | 5/2012 | Davis et al. |
| 2012/0144014 A1 | 6/2012 | Natham et al. |
| 2012/0151353 A1 | 6/2012 | Joanny |
| 2012/0155495 A1 | 6/2012 | Clee et al. |
| 2012/0239792 A1 | 9/2012 | Banerjee et al. |
| 2012/0240185 A1 | 9/2012 | Kapoor et al. |
| 2013/0007225 A1 | 1/2013 | Gage et al. |
| 2013/0074177 A1 | 3/2013 | Varadhan et al. |
| 2013/0083725 A1 | 4/2013 | Mallya et al. |
| 2013/0089099 A1 | 4/2013 | Pollock et al. |
| 2013/0091273 A1 | 4/2013 | Ly et al. |
| 2013/0148500 A1 | 6/2013 | Sonoda et al. |
| 2013/0166731 A1 | 6/2013 | Yamanaka et al. |
| 2013/0191548 A1 | 7/2013 | Boddukuri et al. |
| 2013/0262702 A1 | 10/2013 | Davis |
| 2013/0282791 A1 | 10/2013 | Kruglick |
| 2013/0311686 A1 | 11/2013 | Fetterman et al. |
| 2014/0047115 A1 | 2/2014 | Lipscomb et al. |
| 2014/0164617 A1 | 6/2014 | Jalan et al. |
| 2014/0258465 A1 | 9/2014 | Li |
| 2014/0258536 A1 | 9/2014 | Chiong |
| 2014/0269728 A1 | 9/2014 | Jalan et al. |
| 2014/0330982 A1 | 11/2014 | Jalan et al. |
| 2014/0334485 A1 | 11/2014 | Jain et al. |
| 2015/0085650 A1 | 3/2015 | Cui et al. |
| 2015/0215436 A1 | 7/2015 | Kancherla |
| 2015/0281087 A1 | 10/2015 | Jalan et al. |
| 2015/0350383 A1 | 12/2015 | Davis |
| 2015/0381465 A1 | 12/2015 | Narayanan et al. |
| 2016/0036778 A1 | 2/2016 | Chen et al. |
| 2016/0050233 A1 | 2/2016 | Chen et al. |
| 2016/0105395 A1 | 4/2016 | Chen et al. |
| 2016/0105446 A1 | 4/2016 | Chen et al. |
| 2016/0119382 A1 | 4/2016 | Chen et al. |
| 2016/0139910 A1 | 5/2016 | Ramanathan et al. |
| 2016/0173579 A1 | 6/2016 | Jalan et al. |
| 2017/0041350 A1 | 2/2017 | Chen et al. |

FOREIGN PATENT DOCUMENTS

| | | |
|---|---|---|
| CN | 101567818 A | 10/2009 |
| CN | 102104548 A | 6/2011 |
| CN | 102918801 A | 2/2013 |
| CN | 103365654 A | 10/2013 |
| CN | 102918801 B | 5/2016 |
| EP | 0648038 A2 | 4/1995 |
| EP | 1770915 A1 | 4/2007 |
| EP | 1885096 A1 | 2/2008 |
| EP | 2577910 A2 | 4/2013 |
| HK | 1183569 A | 12/2013 |
| HK | 1188498 A | 5/2014 |
| JP | 2001298449 A | 10/2001 |
| JP | 2013528330 A | 7/2013 |
| JP | 5946189 B2 | 6/2016 |
| WO | WO2011149796 A2 | 12/2011 |
| WO | WO2014088741 A1 | 6/2014 |
| WO | WO2014144837 A1 | 9/2014 |
| WO | WO2014179753 A2 | 11/2014 |

OTHER PUBLICATIONS

Samar, V., "Single Sign-On Using Cookies for Web Applications," IEEE 8th International Workshop, 1999, pp. 158-163.
"Allot Announces the General Availability of its Directory Services-Based NetPolicy™ Manager," Allot Communications, Tel Aviv, Israel, Feb. 28, 2000, 2 pages.
"Allot Communications Announces Business-Aware Network Policy Manager," Allot Communications, Sophia Antipolis, France, Sep. 20, 1999, 2 pages.
"Allot Communications Announces Directory Services Based Network Policy Manager," Allot Communications, Los Gatos, California, Apr. 5, 1999, 2 pages.
"Allot Communications Announces the Netenforcer Family of IP Traffic Management Products: Fault-Tolerant, Scaleable, Policy-Based Bandwidth Management, QOS, SLA Solutions," Allot Communications, Burlingame, California, Dec. 13, 1999, 2 pages.
"Allot Communications Launches NetEnforcer with NetWizard, the Fastest Way to Implement Accurate and Reliable Network QoS Policies," Allot Communications, Burlingame, California, Jan. 25, 2001, 2 pages.
"Allot Introduces Turnkey Next Generation IP Service and Creation Solution—the Virtual Bandwidth Manager," Allot Communications, Atlanta, Georgia, SUPERCOMM 2000, Booth #8458, Jun. 5, 2000, 2 pages.
"Data Communications Awards Allot Communications 'Hot Product' in Internetworking/IP Tools Category," Allot Communications, Los Gatos, California, Jan. 18, 1999, 2 pages.
"Policy-Based Network Architecture," Allot Communications, 2001, 12 pages.
Dahlin, A. et al, "EDDIE A Robust and Scalable Internet Server," Ericsson Telecom AB, Stockholm, Sweden, pp. 1-7 (May 1998).
Aron, Mohit et al., "Efficient Support for P-HTTP in Cluster-Based Web Servers," Proceedings of 1999 Annual Usenix Technical Conference, Monterey, California, Jun. 1999, 14 pages.
Aron, Mohit et al., "Scalable Content-aware Request Distribution in Cluster-based Network Servers," Proceedings of the 2000 Annual Usenix Technical Conference, San Diego, California, Jun. 2000, 15 pages.
Aron, Mohit, "Scalable Content-aware Request Distribution in Cluster-based Network Servers," Department of Computer Science, Rice University [Online, retrieved on Mar. 13, 2001], Retreived from the Internet: <URL:http://softlib.rice.edu/softlib/scalableRD.html>, 8 pages.
"ACEdirector™: 8-PORT 10/100 MBPS Ethernet Switch," Alteon WebSystems, San Jose, California (1999), 2 pages.
"Enhancing Web User Experience with Global Server Load Balancing," Alteon WebSystems, San Jose, California, Jun. 1999, 8 pages.
"The Next Step in Server Load Balancing," Alteon WebSystems, San Jose, California, Nov. 1999, 16 pages.
"1.3.1.2.5 Virtual IP Addressing (VIPA)," excerpt from "IP Configuration" [online], IBM Corporation, 1998 [retreived on Sep. 8, 1999], retrieved from the Internet: <URL:http://w3.enterlib.ibm.com:80/cgi-bin/bookmgr/books/F1AF7001/1.3.1.2>, 4 pages.
"1.3.20 Device and LINK Statement-Virtual Devices (VIPA)," excerpt from "IP Configuration" [online], IBM Corporation, 1998 [retrieved on Sep. 8, 1999], retrieved from the Internet: <URL:http://w3.enterlib.ibm.com:80/cgi-bin/bookmgr/books/F1AF7001/1.3.2>, 3 pages.
"1.3.23 Home Statement," excerpt from "IP Configuration" [online], IBM Corporation, 1998 [retrieved on Sep. 8, 1999], retrieved from the Internet: <URL:http://w3.enterlib.ibm.com:80/cgi-bin/bookmgr/books/F1AF7001/1.3.2>, 6 pages.
Devine, Mac, "TCP/IP Application Availability and Workload Balancing in the Parallel Sysplex," SHARE Technical Conference, Aug. 22-27, 1999, 17 pages.
Pai, Vivek S. et al., "Locality-Aware Request Distribution in Cluster-based Network Servers," Proceedings of the 8th International Conference on Architectural Support for Programming Languages and Operating Systems (ASPLOS VIII), San Jose, CA, Oct. 1998, 12 pages.
Apostolopoulos, G. et al., "Design, Implementation and Performance of a Content-Based Switch," INFOCOM 2000, Nineteenth Annual Joint Conference of the IEEE Computer and Communication Societies, IEEE, Mar. 2000, pp. 1117-1126, vol. 3.

\* cited by examiner

Network Traffic Policy 451

Network based Application Session Access Control
Session Connection Rate Control
Traffic Shaping Control
Bandwidth Rate Capacity
Quality of Service or DSCP Marking Control
Packet Forwarding Control
Link Interface Preference
Server Load Balancing Preference
Application Session Modification Control

FIG. 8

APPLYING A NETWORK TRAFFIC POLICY TO AN APPLICATION SESSION

CROSS-REFERENCE TO RELATED APPLICATIONS

The present application is a continuation of and claims the priority benefit of U.S. patent application Ser. No. 14/973,675, filed on Dec. 17, 2015, issued as U.S. Pat. No. 9,356,910 on May 31, 2016; which in turn is a continuation of U.S. patent application Ser. No. 14/323,920, filed on Jul. 3, 2014, issued as U.S. Pat. No. 9,253,152 on Feb. 2, 2016; which in turn is a continuation of U.S. patent application Ser. No. 14/061,722, filed on Oct. 23, 2013, issued as U.S. Pat. No. 8,826,372 on Sep. 2, 2014; which in turn is a continuation of U.S. patent application Ser. No. 13/716,124, filed on Dec. 15, 2012, issued as U.S. Pat. No. 8,584,199 on Nov. 12, 2013; which in turn is a continuation-in-part of U.S. patent application Ser. No. 13/650,179, filed on Oct. 12, 2012, issued as U.S. Pat. No. 8,595,791 on Nov. 26, 2013; which in turn is a continuation of U.S. patent application Ser. No. 12/788,339, filed on May 27, 2010, issued as U.S. Pat. No. 8,312,507 on Nov. 13, 2012; which in turn is a continuation-in-part of U.S. patent application Ser. No. 12/771,491, filed on Apr. 30, 2010, issued as U.S. Pat. No. 7,979,585 on Jul. 12, 2011; which in turn is a continuation of U.S. patent application Ser. No. 11/582,613, filed on Oct. 17, 2006, issued as U.S. Pat. No. 7,716,378, on May 11, 2010. The disclosures of the above referenced applications are hereby incorporated by reference.

BACKGROUND OF THE INVENTION

Field

This invention relates generally to data networking, and more specifically, to a system and method to apply a network traffic policy based on a user identity during an application session.

Related Art

The secure data network of a company is a critical component for day-to-day functioning of company business activities. Company employees access the secure data network for communication within the company and with the outside world. Company information, oftentimes proprietary or confidential, is exchanged during the communication.

Typically, an employee gains access to the company's secure data network by means of a network logon procedure using a private user identity, such as a user name "Robert P. Williamson" or an employee number "NG01-60410". Subsequent information exchange using the company's office applications, such as email, file transfer or document control is traceable based on the private user identity through network event logs.

Since the late 1990's, we have been witnessing the phenomenal rising popularity of public communication applications and services, such as email and Instant Messaging offered by Yahoo™, America Online™ (AOL), or Google™, conferencing and collaboration services offered by WebEx™ or Centra™, or peer-to-peer services for a variety of file sharing. Generally, a public communication service allows a user to exchange information through messaging, text chat or document exchange using a public user identity, such as "butterdragon", "fingernail1984", or "peterrabbit".

However, in a company setting, when an employee connects to a public communication service with a public user identity over the company's secure data network, the information exchange is not easily traceable if at all since the public user identity is not tied to the private user identity.

In one example, a company's information technology (IT) department notices that an employee Victor has been using the company's email system to send out proprietary documents, violating the company's security policy. After issuing a warning to Victor, the IT department finds no further violations. Unfortunately, they are not aware of the fact that Victor has continued this activity using Yahoo™ email with a public user identity "PiratesOfCaribbean@Yahoo.com".

In another example, two weeks before a major trade show, a company implements a security measure to monitor communication activities of employees of director level and above to ensure confidentiality of competitive information. This security measure, covering company email, phone conversation and voice messaging, nevertheless proves to be a failure as sensitive information leaks out to a business reporter anyway prior to the trade show. The source of the leak may never be confirmed, but the business reporter privately discloses that he gets the information from an anonymous employee of the company using AOL Instant Messaging™ with screen name "opensecret2006".

In addition to associating a user identity to an application session, the company often desires to handle the network traffic of the associated application session in a control or isolated manner.

The above discussion illustrates a need for a security driven packet forwarding solution to associate a user identity to an application.

BRIEF SUMMARY OF THE INVENTION

According to some embodiments of the present invention, a method for applying a security policy to an application session, comprises: determining, by a security gateway, a first user identity and a second user identity from a data packet for an application session; obtaining, by the security gateway, a security policy for the application session; and applying the security policy to the application session by the security gateway. The user identity may be a network user identity or an application user identity recognized from packets of the application session. The security policy may comprise a network traffic policy mapped and/or a document access policy mapped to the user identity, where the network traffic policy is applied to the application session. The security gateway may further generate a security report concerning the application of the security policy to the application session.

BRIEF DESCRIPTION OF THE DRAWINGS

FIG. 8 illustrates a plurality of embodiments of network traffic policy according to an embodiment of the present invention.

DETAILED DESCRIPTION OF THE INVENTION

Figure 1A:
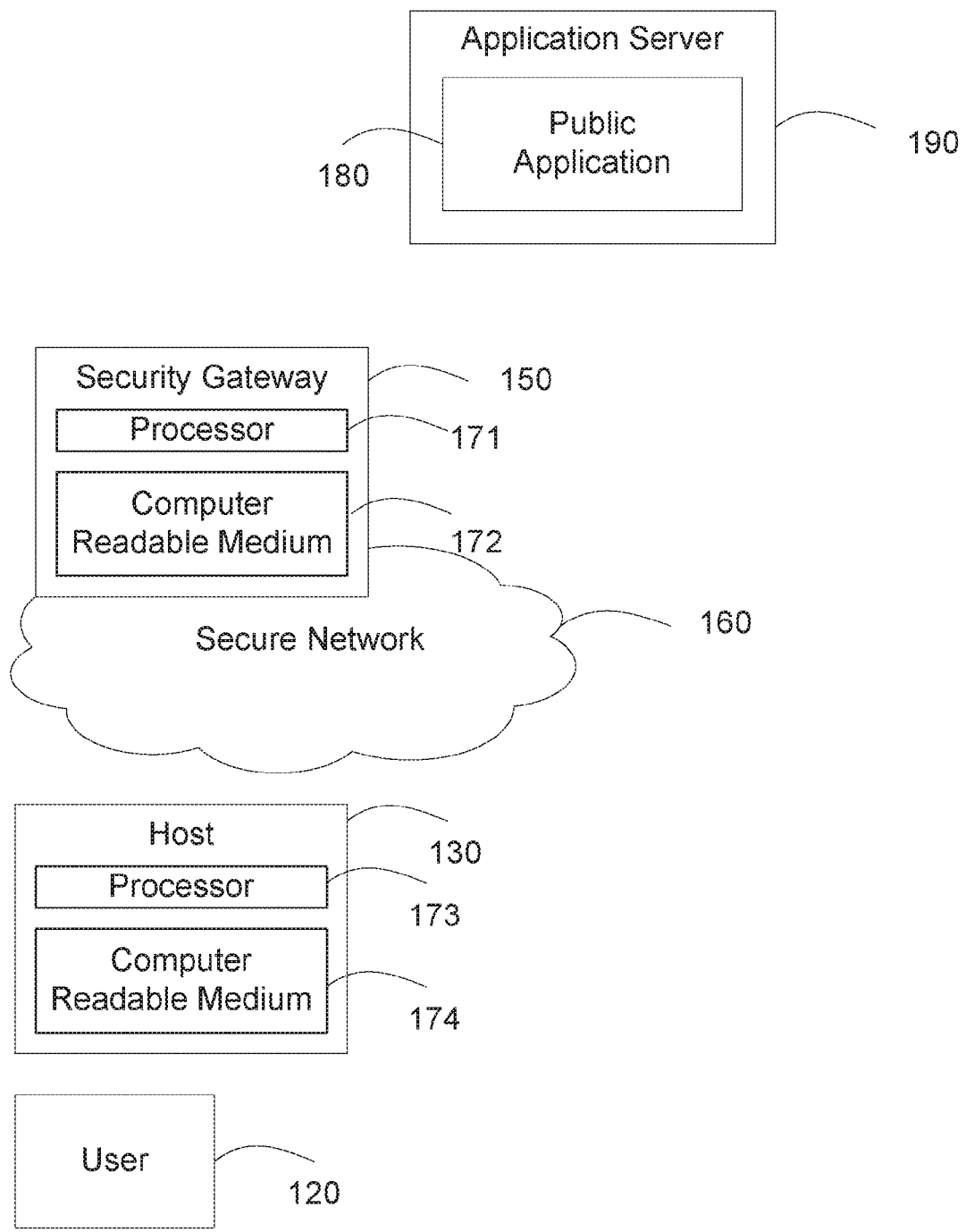
FIG. 1A illustrates a secure network according to an embodiment of the present invention.

FIG. 1A illustrates a secure network according to an embodiment of the present invention.

A secure network 160 includes a host 130. User 120 uses host 130 to access a public application 180 hosted in application server 190. Application server 190 is outside of secure network 160. The network traffic between host 130 and application server 190 passes through security gateway 150. The security gateway 150 is operationally coupled to a processor 171 and a computer readable medium 172. The computer readable medium 172 stores computer readable program code for implementing the various embodiments of the present invention as described herein.

Host 130 is a computing device with network access capabilities. The host 130 is operationally coupled to a processor 173 and a computer readable medium 174. The computer readable medium 174 stores computer readable program code for implementing the various embodiments of the present invention as described herein. In some embodiments, host 130 is a workstation, a desktop personal computer or a laptop personal computer. In some embodiments, host 130 is a Personal Data Assistant (PDA), a smartphone, or a cellular phone.

In some embodiments, secure network 160 is an Internet Protocol (IP) network. In some embodiments, secure network 160 is a corporate data network or a regional corporate data network. In some embodiments, secure network 160 is an Internet service provider network. In some embodiments, secure network 160 is a residential data network. In some embodiments, secure network 160 includes a wired network such as Ethernet. In some embodiments, secure network 160 includes a wireless network such as a WiFi network.

Public application 180 provides a service that allows user 120 to communicate with other users in a real-time fashion. In some embodiments, the service includes text chat. In some embodiments, the service includes a voice call or a video call. In some embodiments, the service includes a network game. In some embodiments, the service includes exchanging a document, such as sending or receiving a text document, a PowerPoint™ presentation, an Excel™ spreadsheet, an image file, a music file or a video clip. In some embodiments, the service includes a collaborative document processing such as creating a document, a business plan, an agreement, wherein user 120 collaborates with other users in a real time fashion. In some embodiments, the service includes a collaborative information exchange such as a conference call. In some embodiments, the service is a social networking service. In some embodiments, the service includes real-time collaboration and non real-time collaboration.

In one example, public application 180 provides America Online Instant Messenger™ service. In one example, public application 180 provides Yahoo Instant Messenger™ voice service. In some embodiments, public application 180 provides a file sharing service such as Kazaa™ file sharing service. In some embodiments, public application 180 provides a network game service such as Microsoft™ Network Game service. In some embodiments, public application 180 provides an on-line collaborative document processing such as Google Docs™, and Salesforce.com™. In some embodiments, public application 180 provides an on-line information exchange and communications such as WebEx™. In some embodiments, public application 180 provides live information streaming such as live video streaming, live audio streaming, and instantaneous picture uploading.

Security gateway 150 is situated at the edge of secure network 160. Security gateway 150 connects secure network 160 to public application 180. Security gateway 150 receives network traffic from secure network 160 and transmits the network traffic to application server 190. Likewise, security gateway 150 receives network traffic from application server 190 and transmits the network traffic to secure network 160.

In some embodiments, security gateway 150 includes the function of a corporate Wide Area Network (WAN) gateway. In some embodiments, security gateway 150 includes the function of a residential broadband gateway. In some embodiments, security gateway 150 includes the function of a WAN gateway for an Internet service provider.

Figure 1B:
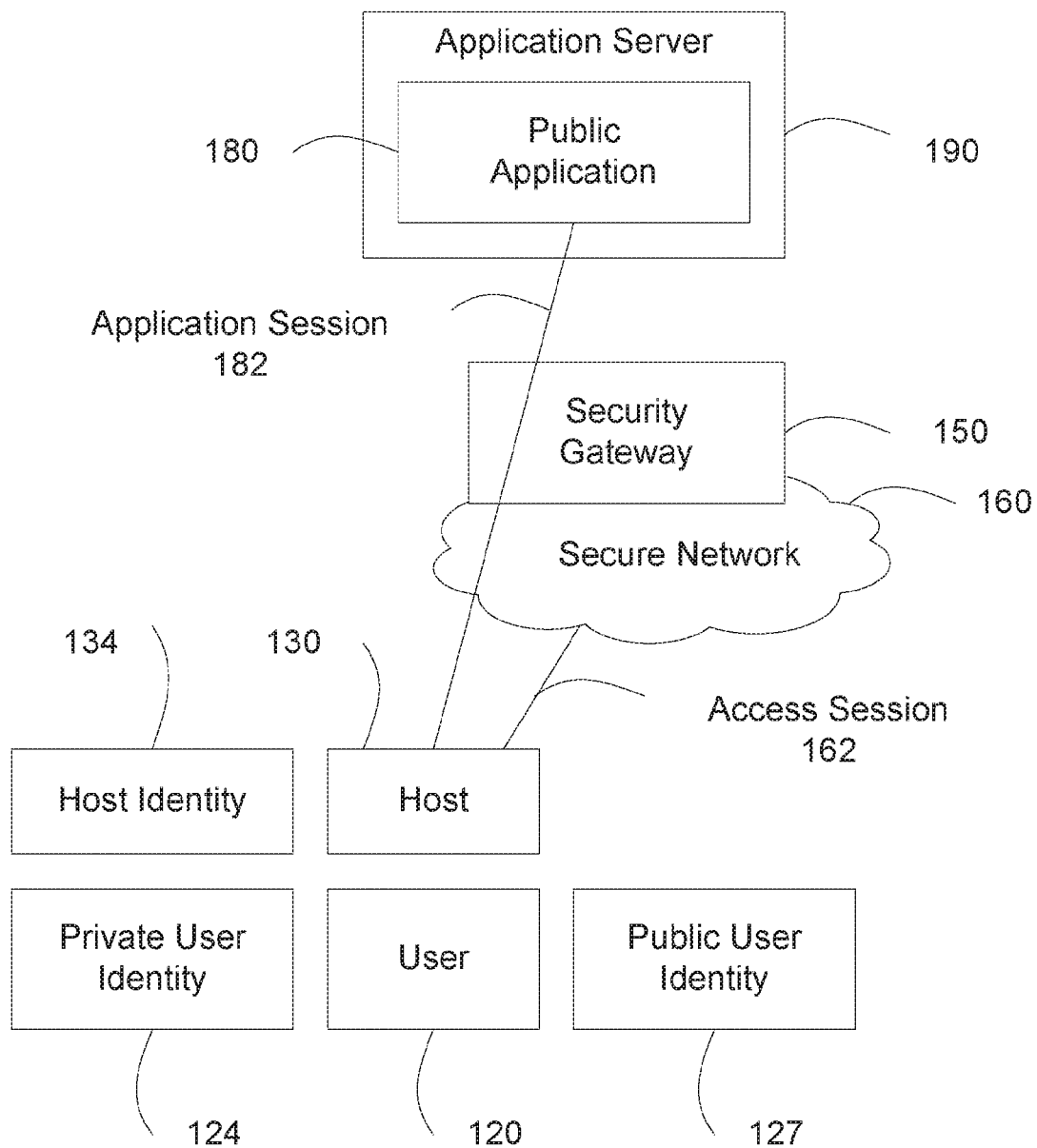
FIG. 1B illustrates an access session and an application session according to an embodiment of the present invention.

FIG. 1B illustrates an access session and an application session according to an embodiment of the present invention.

User 120 uses host 130 to access secure network 160 during an access session 162.

Host 130 has a host identity 134. Host 130 uses host identity 134 to connect to secure network 160. In some embodiments, host identity 134 includes an Internet Protocol (IP) address. In some embodiments, host identity 134 includes a Media Access Control (MAC) address.

Within secure network 160, user 120 has a private user identity 124. In some embodiments, private user identity 124 is an employee number or an employee name. In some embodiments, private user identity 124 is an Internet service subscription identity. In some embodiments, access session 162 is established after a successful network user log-in procedure, such as an employee network log-in, for secure network 160 using private user identity 124. Private user identity 124 is associated with host identity 134. In some embodiments, host 130 is a guest computing device. Private user identity 124 is associated with an Ethernet switch port where host 130 connects. In this embodiment, private user identity 124 is a port number, an Ethernet interface identity, or an Ethernet VLAN identity.

User 120 uses host 130 to access public application 180 in an application session 182. User 120 uses a public user identity 127 during application session 182. In some embodiments, public application 180 prompts user 120 to log-in before establishing application session 182. During the application user log-in procedure, user 120 provides to public application 180 public user identity 127. In another embodiment, public application 180 selects a public user identity 127 for user 120 for application session 182. In some embodiments, public user identity 127 is set up through a user registration process or a service subscription process. Network traffic in application session 182 passes through security gateway 150.

Figure 1C:
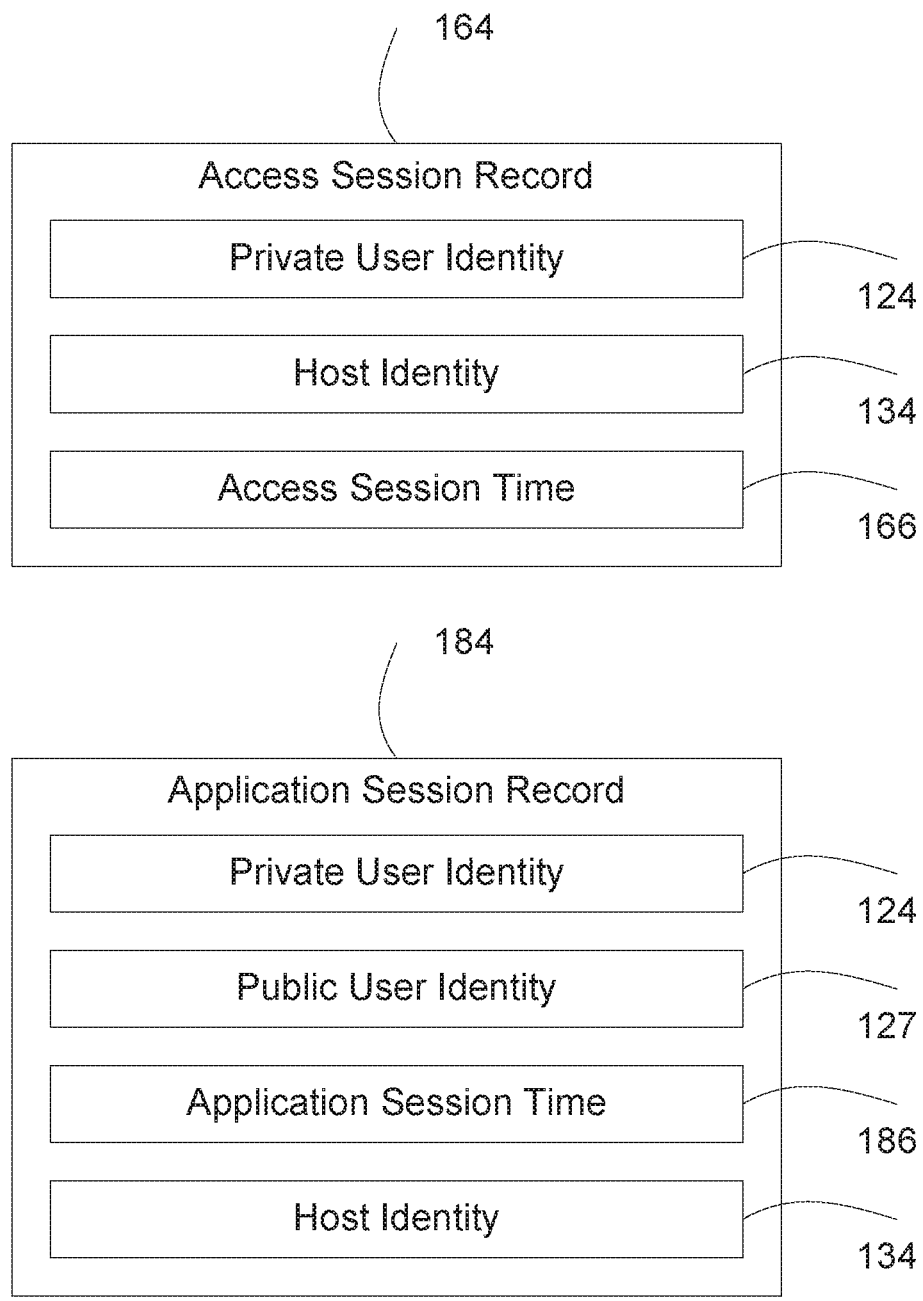
FIG. 1C illustrates an access session record and an application session record according to an embodiment of the present invention.

FIG. 1C illustrates an access session record and an application session record according to an embodiment of the present invention.

Access session record 164 records information about access session 162. The information includes private user identity 124, host identity 134 and access session time 166. In some embodiments, access session time 166 is the starting time when access session 162 is established. In some embodiments, access session time 166 includes the starting time and the ending time when user 120 finishes access session 162. In some embodiments, access session time 166 is a time stamp for a time during access session 162.

Application session record 184 records information about application session 182. The information includes private user identity 124, public user identity 127, and application session time 186. In some embodiments, the information further includes host identity 134. In some embodiments, application session time 186 includes the starting time when application session 182 is established. In some embodiments, application session time 186 includes a time stamp during application session 182. In some embodiments, application session time 186 includes a time stamp when security gateway 150 recognizes application session 182.

Figure 2:
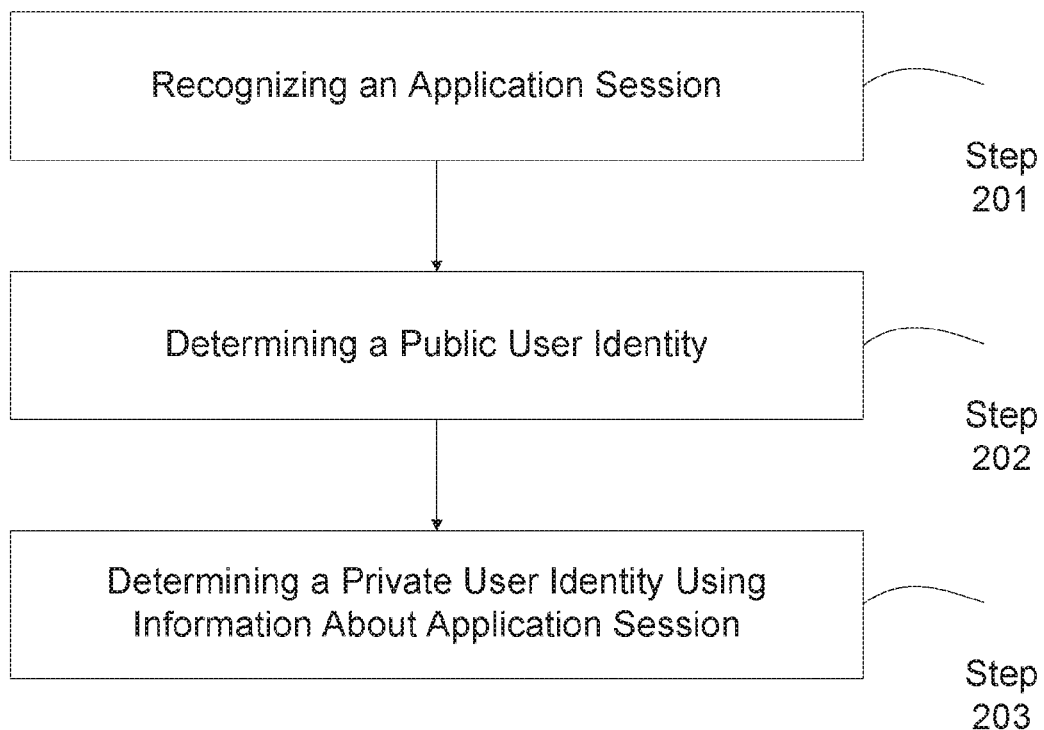
FIG. 2 illustrates a process to generate an application session record according to an embodiment of the present invention.

FIG. 2 illustrates a process to generate an application session record according to an embodiment of the present invention.

The process of generating application session record 184 includes multiple steps.

In step 201, security gateway 150 recognizes an application session.

In step 202, security gateway 150 determines a public user identity of the application session.

In step 203, security gateway 150 determines a private user identity using information about the application session.

Figure 3:
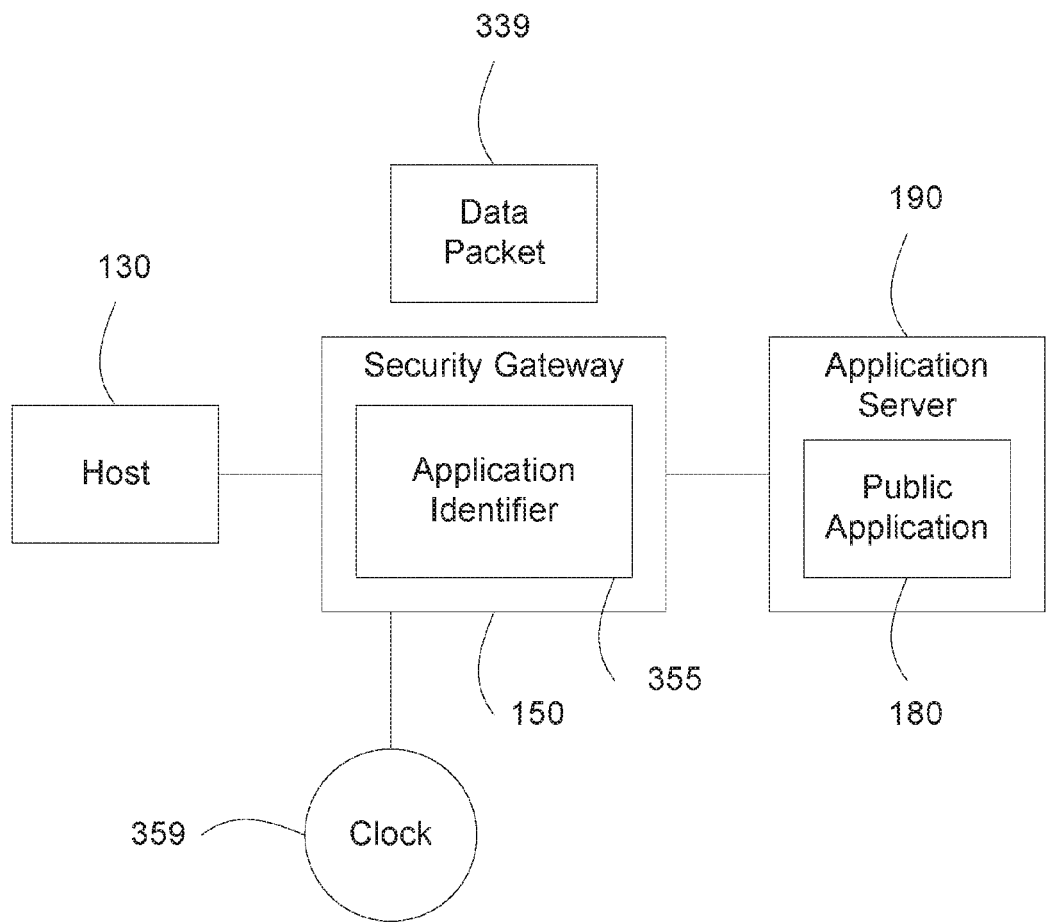
FIG. 3 illustrates a process to recognize an application session according to an embodiment of the present invention.
Figure 4A:
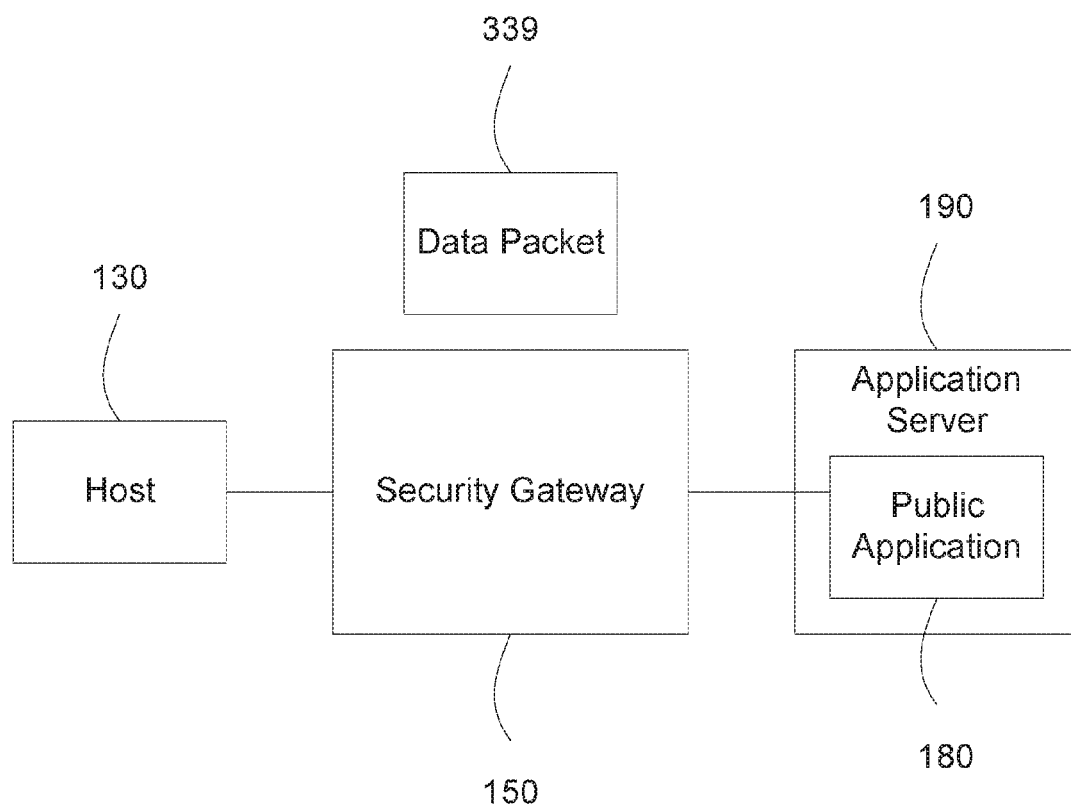
FIG. 4A illustrates a process to determine a public user identity of application session according to an embodiment of the present invention.
Figure 4B:
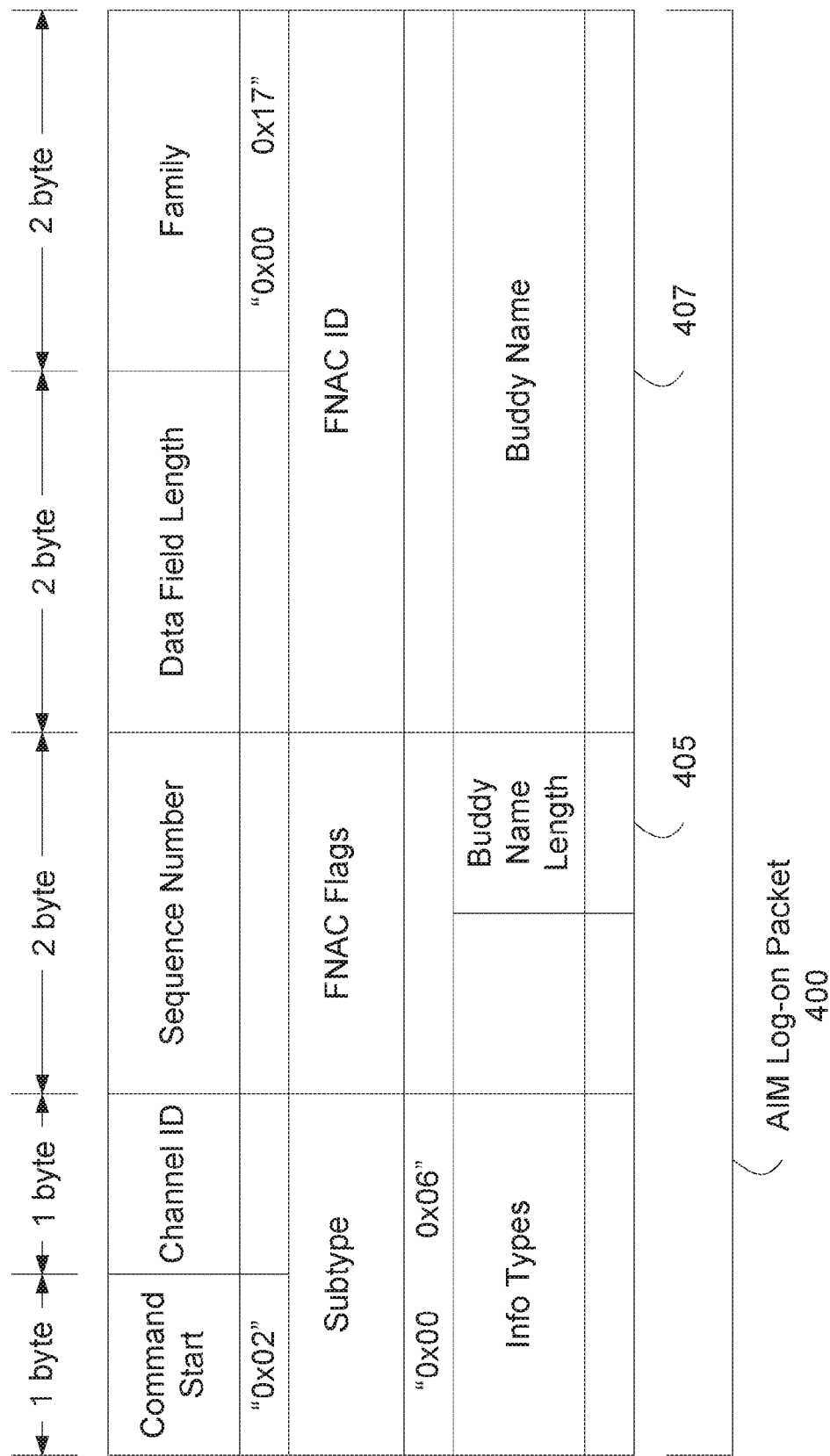
FIG. 4B illustrates a data packet in an AIM log-on packet according to an embodiment of the present invention.
Figure 5:
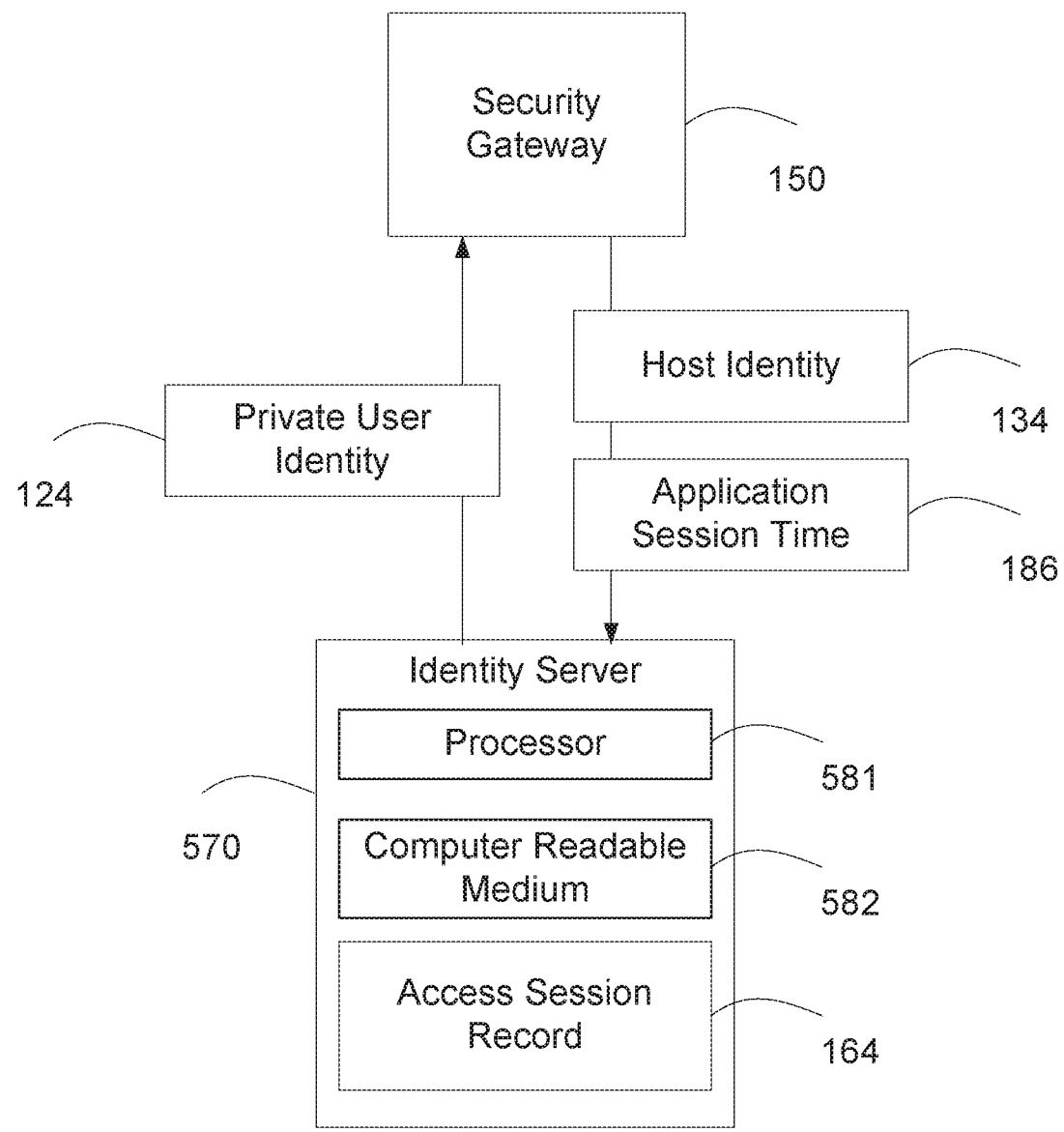
FIG. 5 illustrates a process to determine a private user identity according to an embodiment of the present invention.

FIGS. 3-5 illustrates steps 201-203 respectively.

FIG. 3 illustrates a process to recognize an application session according to an embodiment of the present invention.

Security gateway 150 inspects network traffic between host 130 and application server 190 to recognize application session 182 for public application 180.

In some embodiments, security gateway 150 inspects data packet 339 between host 130 and application server 190 for the recognition of application session 182.

Security gateway 150 includes an application identifier 355 for public application 180. Application identifier 355 includes information for recognizing application session 182. In some embodiments, application identifier 355 includes a transport layer information, such as Transmission Control Protocol (TCP) or User Diagram Protocol (UDP); and at least one transport port number, such as a TCP port number or a UDP port number. In some embodiments, application identifier 355 includes application layer information, such as one or more data filters wherein a data filter specifies a value and a position of the value in a data packet. In one example, a data filter is [byte 0 with value "0x52"]. In one example, a data filter is [byte 4-7 with ASCII value of "ADER"].

Security gateway 150 matches data packet 339 against application identifier 355.

In some embodiments, application identifier 355 includes transport protocol type of TCP and a destination TCP port number of 5190, the TCP port number used by AIM protocol. In this embodiment, data packet 339 is a TCP packet from host 130 to application server 190. Security gateway 150 matches data packet 339 against application identifier 355 and determines that public application 180 provides AIM service.

Security gateway 150 creates application session record 184. Security gateway 150 extracts the source IP address from the IP header of data packet 339 and stores the source IP address as host identity 134. In some embodiments, data packet 339 includes link layer information, such as a source MAC address; security gateway 150 extracts and stores the source MAC address as host identity 134.

In some embodiments, security gateway 150 connects to a clock 359. Clock 359 indicates the current time of day. Security gateway 150 stores the time of day indicated by clock 359 in application session time 186.

FIG. 4A illustrates a process to determine a public user identity of application session 182 according to an embodiment of the present invention.

The method for determining public user identity 127 is typically specific to public application 180. In some embodiments, data packet 339 is an application packet. For example, public application 180 provides AIM service; data packet 339 is an AIM packet.

An AIM packet includes multiple fields, for example

Command start field is a 1-byte data field starting at byte offset 0 having a fixed hexadecimal value "0x02";

Channel ID field is a 1-byte data field starting at byte offset 1;

Sequence number field is a 2-byte integer starting at byte offset 2;

Data field length field is a 2-byte data field starting at byte offset 4;

Family field is a 2-byte data field starting at byte offset 6; and

Subtype field is a 2-byte data field starting at byte offset 8.

An AIM log-on packet is a AIM packet with family field having a fixed hexadecimal value of "0x00 0x17" and subtype field having a fixed hexadecimal value of "0x00 0x06".

AIM log-on packet further includes buddy name length field, a 1-byte integer starting at byte offset 19, and a variable length buddy name field starting at byte offset 20. Buddy name length field indicates the length in bytes of buddy name field.

Security gateway 150 matches data packet 339 to determine if data packet 339 is an AIM log-on packet. In some embodiments, data packet 339 is an AIM log-on packet 400 illustrated in FIG. 4B. Security gateway 150 extracts buddy name length field 405. Security gateway 150 further extracts buddy name field 407. In this embodiment, buddy name length field 405 is integer "13" and buddy name field 407 is "JohnSmith1984". Security gateway 150 stores "JohnSmith1984" as public user identity 127 in application session record 184.

In some embodiments, data packet 339 is not an AIM log-on packet. Security gateway 150 inspects another data packet from host 130.

FIG. 5 illustrates a process to determine a private user identity according to an embodiment of the present invention.

Secure network 160 includes an identity server 570. The identity server 570 is operationally coupled to a processor 581 and a computer readable medium 582. The computer readable medium 582 stores computer readable program code for implementing the various embodiments of the present invention as described herein. Identity server 570 includes access session record 164 of access session 162 during which user 120 accesses application session 182.

Security gateway 150 queries identity server 570. Security gateway 150 sends host identity 134 and application session time 186 to identity server 570.

Identity server 570 receives host identity 134 and application session time 186. Identity server 570 matches host identity 134 and application session time 186 against access session record 164. Identity server 570 determines that host identity 134 matches host identity of access session record 164. Identity server 570 further determines that application session time 186 matches access session time 166 of access session record 164 as application session time 186 is between the starting time and the ending time of access session record 164. Identity server 570 sends private user identity 124 of access session record 164 to security gateway 150 as a response to the query.

Security gateway 150 receives private user identity 124 from identity server 570, and stores private user identity 124 in application session record 184.

In some embodiments, security gateway 150 stores public user identity 127 in application session record 184 after recognizing a log-on approval indication for the public user identity 127 from public application 180.

In some embodiments, security gateway 150 queries identity server 570 immediately after determining public user identity 127. In some embodiments, security gateway 150 queries identity server 570 after application session 182 ends.

In some embodiments, security gateway 150 queries identity server 570 by sending a plurality of host identities in a bulk request; and receives a plurality of private user identities in a bulk response.

In some embodiments, application session record 184 includes additional user information associated with private user identity 124, such as cubicle or office number, cubicle or office location, telephone number, email address, maildrop location, department name/identity, or manager name.

In some embodiments, security gateway 150 obtains the additional user information from identity server 570. In some embodiments, security gateway 150 obtains the additional user information by querying a different server, such as a corporate directory server, by using the private user identity 124 received from identity server 570.

In some embodiments, public application 180 provides file transfer service using File Transfer Protocol (FTP) protocol or a proprietary protocol. In some embodiments, public application 180 provides email service using Simple Mail Transfer Protocol (SMTP), Internet Message Access Protocol (IMAP) or Post Office Protocol version 3 (POP3) protocol.

Figure 6:
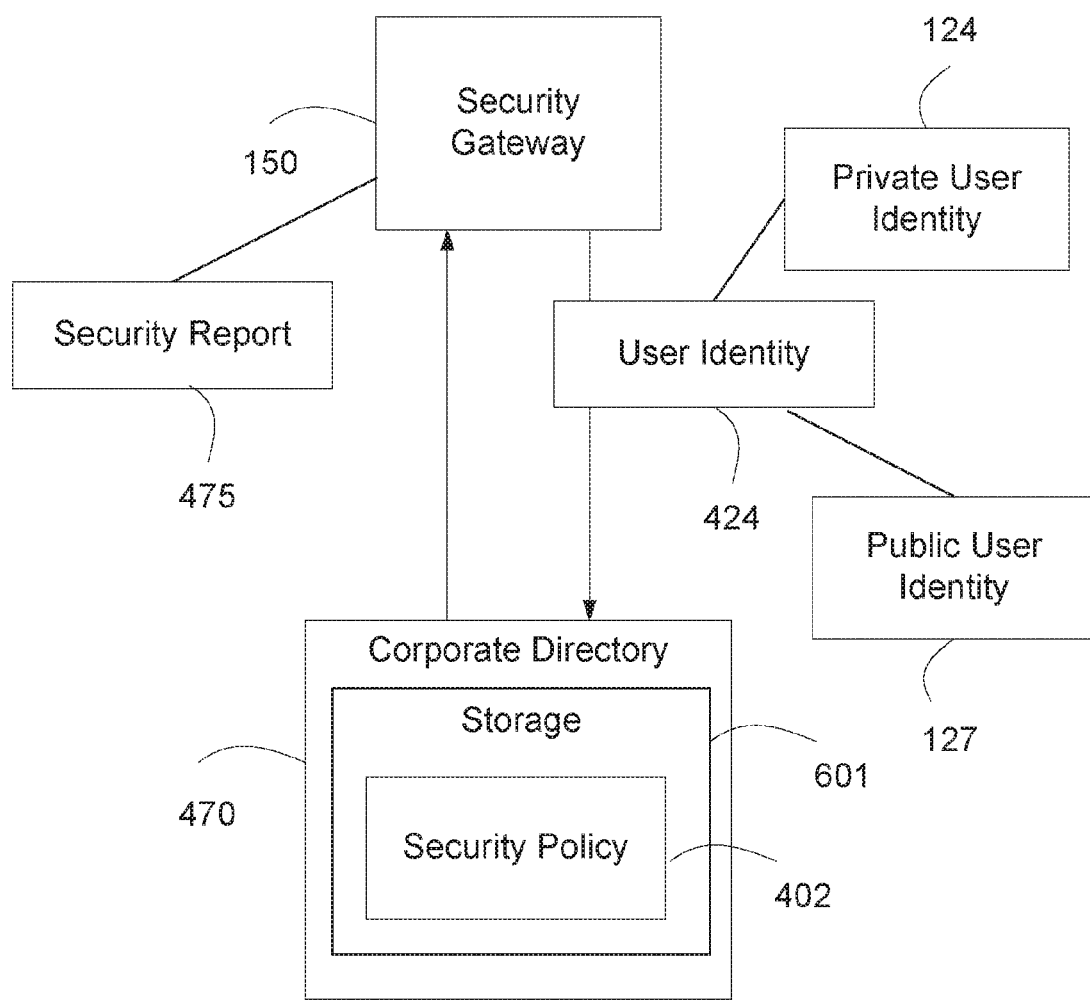
FIG. 6 illustrates an embodiment of a security gateway obtaining a security policy by querying a corporate directory according to an embodiment of the present invention.

By using the application session record, the private user identity 124 and the public user identity 127 for an application session 182 may be determined. In some embodiments as illustrated by FIG. 6, upon determining the pubic user identity and the private user identity, security gateway 150 obtains security policy 402 for the application session 182 by querying corporate directory 470. In an embodiment, corporate directory 470 comprises security policy 402. In some embodiments, corporate directory 470 is a server computer comprising a storage 601 that includes security policy 402. In some embodiments, corporate directory 470 is a database comprising security policy 402. In another embodiment, corporate directory 470 is a software module with program code stored on a computer readable medium (not shown) running in a computer. In some embodiments, corporate directory 470 resides in identity server 570. In some embodiments, corporate directory 470 uses directory technologies such as Microsoft Active Directory™, lightweight directory access protocol (LDAP) directory services, web services, directory services using Java™ technologies. In some embodiments, corporate directory 470 includes a policy server hosting security policy 402 and other policies.

Security gateway 150 queries corporate directory 470 for a security policy, where the query includes user identity 424. User identity 424 may include private user identity 124 or public user identity 127. Corporate directory 470 matches user identity 424 against security policy 402 and determines security policy 402 is applicable to user identity 424. In some embodiments security policy 402 maps network parameters to a user identity and there is a match between user identity 424 and the user identity in the security policy 402. In some embodiments, security policy 402 maps network parameters to a group identity (not shown) and user identity 424 is a member of the group identity. In response to finding the match between the user identity 424 and the user identity in the security policy 402, corporate directory 470 sends security policy 402 to security gateway 150.

In some embodiments, security gateway 150 generates security report 475 based on application session record 184 and security policy 402. In some embodiments, security gateway 150 generates security report 475 based on a pre-determined user identity or a list of pre-determined user identities. For example, the security report may be generated based on an input of user identity or identities. In some embodiments, security gateway 150 generates security report 475 based on a pre-defined schedule or when requested by an operator.

Figure 7:
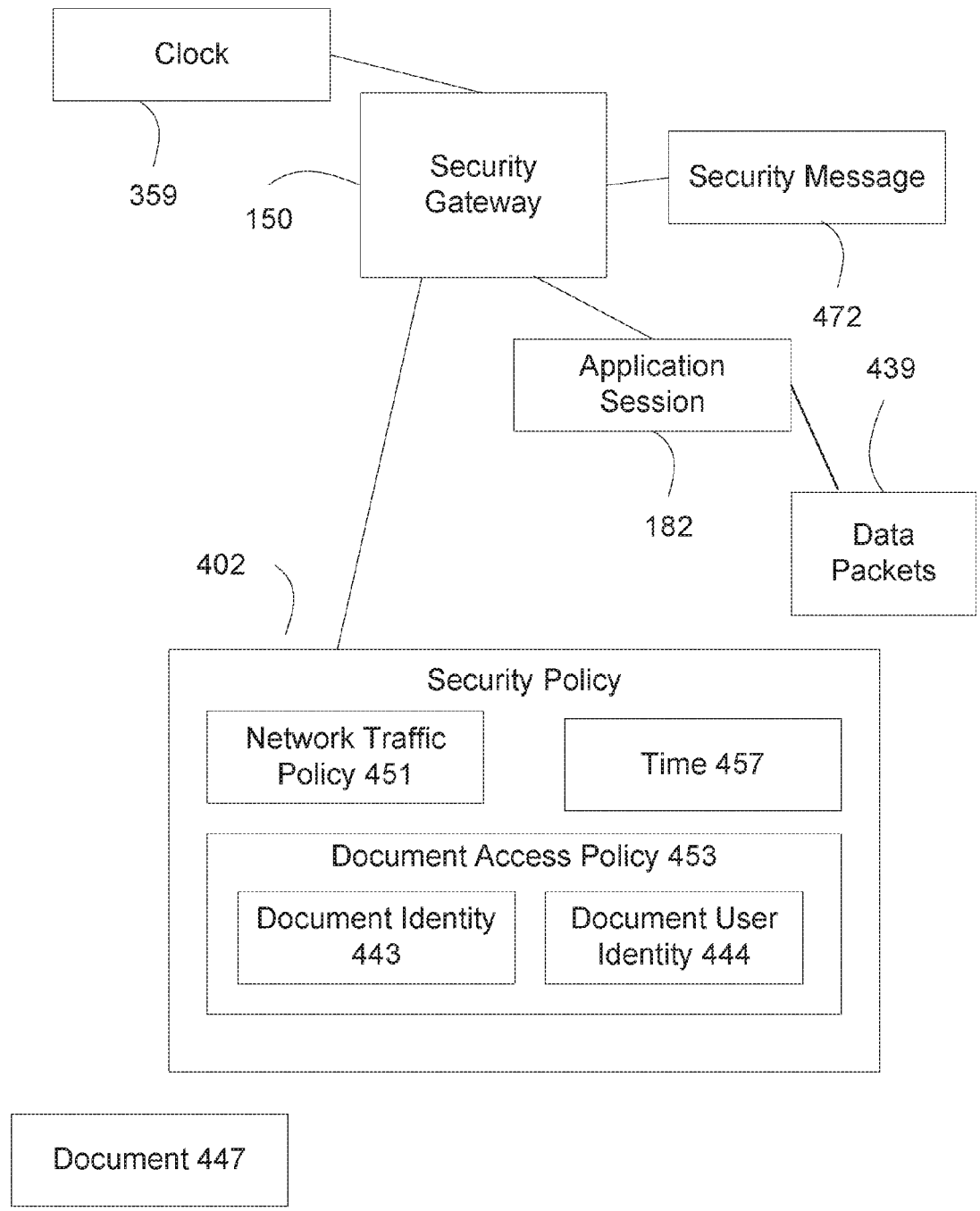
FIG. 7 illustrates a security policy including a security control according to an embodiment of the present invention.

In some embodiments, security policy 402 includes a security control function as illustrated in FIG. 7. Security gateway 150 applies the security policy 402 received from corporate directory 470 in response to the query to application session 182. Security policy 402 typically are configured by a company to protect against improper access to the company confidential documents and to protect against improper usage of the company secure network 160 vital for the company operation. In some embodiments, in response to receiving the security policy 402, the security gateway 150 confirms that the received security policy 402 contains a user identity that matches the user identity 424 sent in the query. In response to the confirmation, the security gateway 150 applies the security policy 402 to the application session 182. In FIG. 7, security policy 402 includes network traffic policy 451 or document access policy 453.

FIG. 8 illustrates a plurality of embodiments of network traffic policy 451 according to various embodiments of the present invention. In some embodiments, network traffic policy 451 specifies network based application session access control indicating if user identity 424 is denied or allowed to continue application session 182. If denied, security gateway 150 may stop forwarding data packets 439 of application session 182. In some embodiments, network traffic policy 451 specifies bandwidth rate capacity such as 1 Mbps, 100 MB per day, or 5 GB per month. In an embodiment, bandwidth rate capacity is measured in packets such as 100 packets per second, 10 thousand packets per day or 4 million packets per month. In some embodiments, network traffic policy 451 specifies a quality of service (QOS) mapped to user identity 424 for application session 182. For example, network traffic policy 451 indicates a change of Differentiated Services Code Point (DSCP) marking in the data packets 439 of application session 182. In some embodiments, network traffic policy 451 specifies a queuing delay, a queuing priority, a packet forwarding path, a link interface preference, a server load balancing preference, a packet routing policy, or other control to handle data packets 439 of application session 182.

In some embodiments, network traffic policy 451 includes a traffic shaping control. In one example, traffic shaping control specifies a TCP profile such as a change of window segment size, or a TCP window adjustment.

In some embodiments, network traffic policy 451 indicates session connection rate control based on user identity 424 specifying a rate or capacity such as 10 session connections per second, 35 concurrent sessions, 100 sessions during lunch hour, 500 sessions a day, 24 voice sessions a day, or 75 file transfer sessions an hour. In some embodiments, network traffic policy 451 may specify, when exceeding the rate or capacity, if application session 182 is denied or data packets 439 of application session 182 are dropped.

In some embodiments, network traffic policy 451 includes application session modification control mapped to user identity 424, specifying how data packets 439 of application session 182 are modified for the user with the user identity 424. In one example, application session modification control specifies security gateway 150 should perform network address translation (NAT) to application session 182 for user identity 424. In one example, security gateway 150 should perform port address translation (PAT) to application session 182 using a pre-determined port number for user identity 424. In another example, security gateway 150 should perform content substitution if application session 182 is an HTTP session and if a Universal Resource Locator (URL) in data packets 439 of application session 182 matches a pre-determined URL for user identity 424. In an example, security gateway 150 should perform filename substitution if application session 182 is a file transfer session and if a filename matching a pre-determined filename is found in data packets 439 of application session 182 for user identity 424. In another example, security gateway 150 should insert a cookie for user identity 424 if application session 182 is an HTTP session, with optionally data packets 439 matching a pre-determined POST or GET request of a URL.

Returning to FIG. 7, in some embodiments, document access policy 453 specifies if access to document 447 is allowed or denied. In some embodiments, document 447 includes a file, a business agreement, a contract, a spreadsheet, a presentation, a drawing, a textual document, a manual, a program, a piece of software program, a design, a product specification, a datasheet, a video file, an audio file, an email, a voice mail, a fax, a photocopy of a document, or any business document. In some embodiments, document 447 includes a URL leading to digital information such as database query result, a web page, a video, or a piece of music. In some embodiments, document 447 includes real time transfer or streaming of information such as video streaming, audio streaming, a webcast, a podcast, a video show, a teleconference session, or a phone call. In some embodiments, document access policy 453 includes document identity 443 and document user identity 444. Document identity 443 identifies document 447. Document user identity 444 identifies the user whose access to the document 447 is affected by the document access policy 453. In an embodiment, security gateway 150 compares user identity 424 with document user identity 444. In response to determining that the user identity 424 matches the document user identity 444, in some embodiments, security gateway 150 allows document 447 with document identity 443 to be accessed by user identity 424. In another embodiment, security gateway 150 denies access to document 447 with document identity 443. In denying access, the security gateway 150 may disconnect application session 182 or discard data packets 439. In some embodiments, security gateway 150 confirms that data packets 439 include document identity 443. In response to confirming that data packets 439 include document identity 443, security gateway 150 applies document access policy 453.

In some embodiments security policy 402 includes time 457 where security policy 402 is applicable within time 457. In some embodiments, time 457 indicates a beginning time such as 8 am, 4 pm, midnight. In an embodiment, time 457 indicates a time range such as 8 am to 10 am, 7 pm to 5 am, morning hours, lunch, rush hour, prime time. Security gateway 150 compares clock 359 with time 457 and determines if security policy 402 is applicable.

In some embodiments, security gateway 150 generates security message 472 when security gateway 150 determines if security policy 402 is applicable to application session 182 for user identity 424. In some embodiments, security gateway generates security message 472 when security gateway 150 applies security policy 402 to application session 182. In some embodiments, security report 475 includes security message 472. In one example, security message 472 includes security policy 402 and user identity 424. In one example, security message 472 includes the actions security gateway 150 applies to application session 182 using security policy 402.

Figure 9:
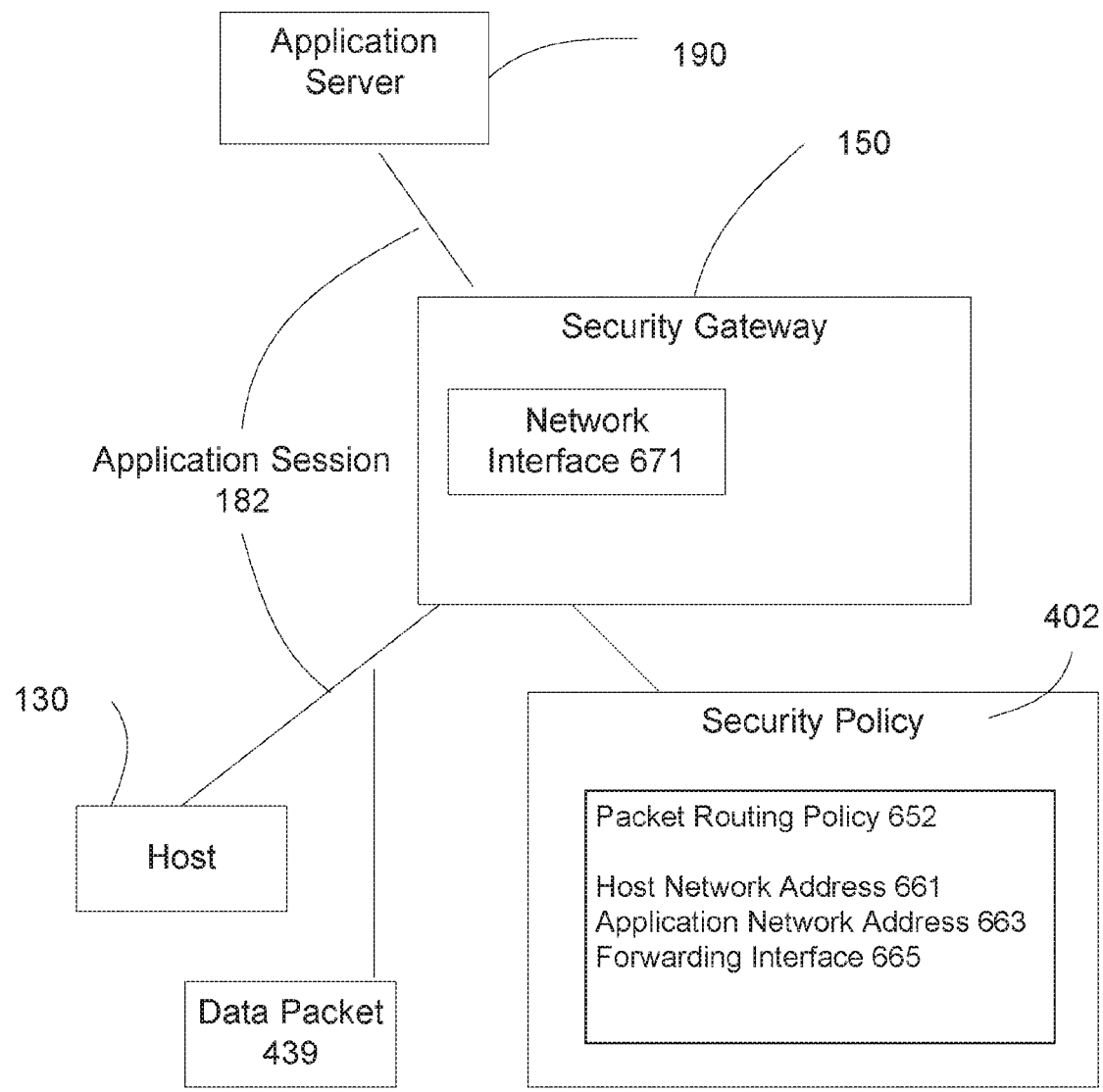
FIG. 9 illustrates a security policy that includes a packet routing policy according to an embodiment of the present invention.

FIG. 9 illustrates an embodiment where security policy 402 includes a packet routing policy 652 according to an embodiment of the present invention. Security gateway 150 is configured to receive and apply packet routing policy 652 of network traffic policy 451 to data packet 439 of application session 182. In some embodiments, packet routing policy 652 includes host network address 661, application network address 663 and forwarding interface 665. In some embodiments, host network address 661 includes IP address of host 130. In some embodiments, host network address 661 includes a transport layer identity such as TCP port number or UDP port number of application session 182. In some embodiments, application network address 663 includes IP address of application server 190. In some embodiments, application network address 663 includes a transport layer information such as TCP port number or UDP port number of application session 182.

Security gateway 150 applies packet routing policy 652 for data packet 439 of application session 182 by first comparing data packet 439 against packet routing policy 652. In some embodiments, security gateway 150 obtains source network address of data packet 439, which may include source IP address and source transport layer information. In some embodiments, security gateway 150 obtains destination network address of data packet 439, which may include destination IP address and destination transport layer information. Security gateway 150 compares source network address of data packet 439 against host network address 661, and in some embodiments, compares destination network address of data packet 439 against application network address 663. When there is match, security gateway 150 processes data packet 439 using forwarding interface 665. In some embodiments, security gateway 150 includes a network interface 671 and forwarding interface 665 indicates transmitting data packet 439 using network interface 671. In some embodiments, forwarding interface 665 indicates a modification to be applied to data packet 439 prior to transmission. In some embodiments, the modification indicated in forwarding interface 665 is to add a tunnel header, such as an IP-IP tunnel header, an L2TP tunnel header, an IPSec tunnel header, or a layer 2 tunnel header. Security gateway 150 applies the modification to data packet 439 and sends the modified data packet 439 to network interface 671.

Figure 10:
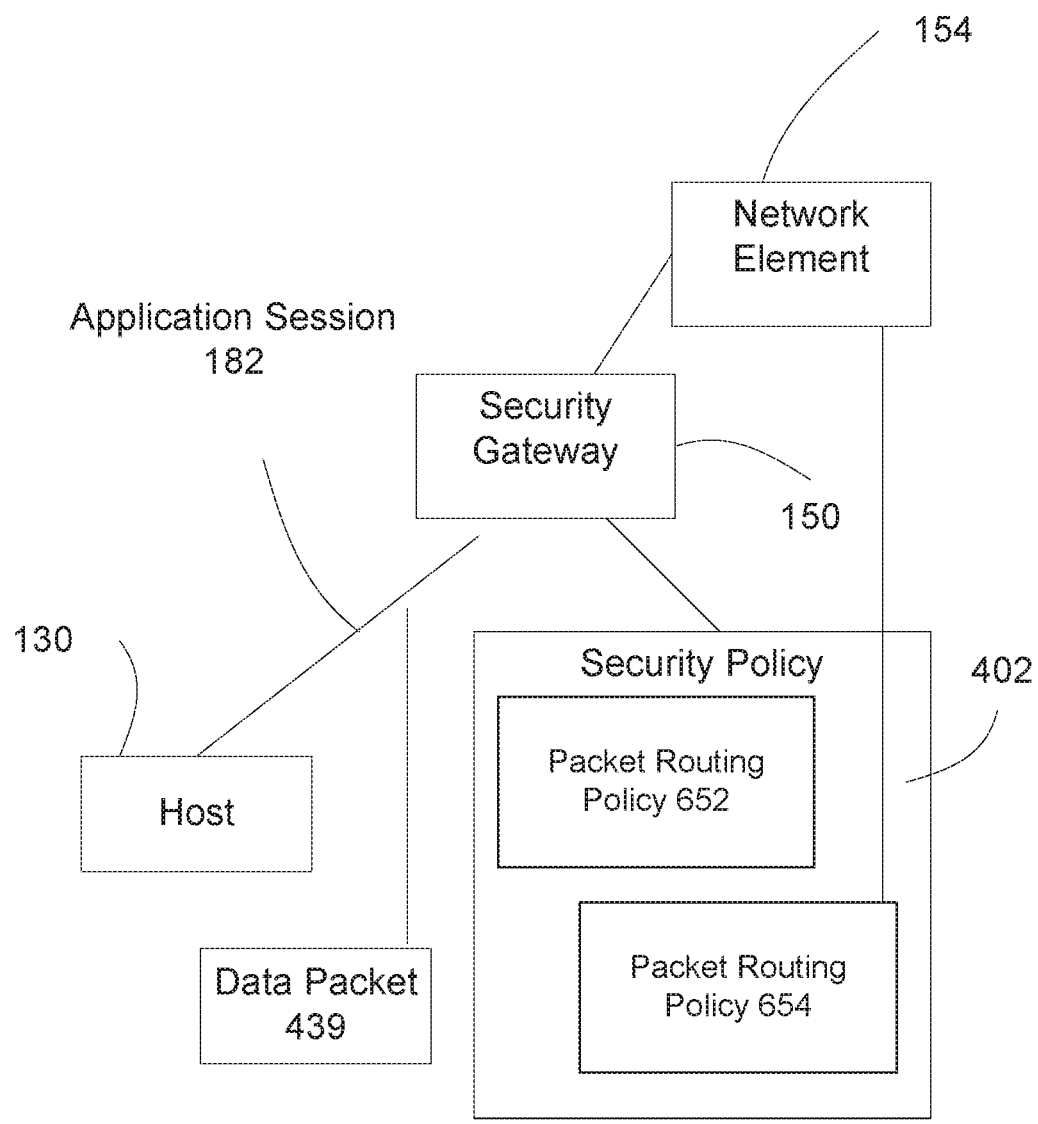
FIG. 10 illustrates a security gateway connected to a network element according to an embodiment of the present invention.

In some embodiments illustrated in FIG. 10, security gateway 150 connects to a network element 154. Embodiments of network element 154 includes functionality of a network switch such as an Ethernet switch, a router, a network gateway, a security gateway similar to security gateway 150, a firewall, and a border gateway. In some embodiments, security policy 402 includes packet routing policy 652 and packet routing policy 654. Packet routing policy 654 is associated with network element 154 and packet routing policy 652 is associated with security gateway 150. Security gateway 150 applies security policy 402 by first sending packet routing policy 654 to network element 154 such that network element 154 can apply packet routing policy 654. Security gateway 150 applies packet routing policy 652 to data packet 439 of application session 182 as illustrated in FIG. 9. In some embodiments, forwarding interface of packet routing policy 652 directs security gateway 150 to send data packet 439 or modified data packet 439 to network element 154.

In some embodiments, network element 154 receives data packet 439 or modified data packet 439 from security gateway 150. Network element 154 applies packet routing policy 654 to received data packet 439 in a similar manner as security gateway 150 applying packet routing policy 652 to data packet 439.

In some embodiments, packet routing policy 654 is associated with one or more additional network elements. Security gateway 150 sends packet routing policy 654 to the additional network elements.

In some embodiments, security gateway 150 applies packet routing policy 654 in conjunction with other attributes of network traffic policy 451.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by the Claims following.

What is claimed is:

1. A method for applying a security policy to an application session, comprising:
determining, by a security gateway, a first user identity and a second user identity from a data packet for an application session, the determining comprising:
inspecting, by the security gateway, the data packet for the application session and storing a host identity and an application session time in an application session record;
determining, by the security gateway, from the data packet for the application session a user identity and storing the user identity in the application session record;
determining, by the security gateway, a second user identity by matching an access session record of an access session accessed during the application session that comprises the second user identity, a second host identity, and an access session time, wherein the second host identity, and the access session time match the host identity and the application session time of the application session record;
storing the second user identity in the application session record;
obtaining, by the security gateway, a security policy for the application session based on the first user identity or the second user identity; and
applying the security policy to the application session by the security gateway.

2. The method of claim 1, wherein the obtaining a security policy for the application session comprises:
querying, by the security gateway, a corporate directory comprising a plurality of security policies, the query including a user identity;
matching, by the corporate directory, the user identity of the query against the plurality of security policies to determine whether one of the plurality of security policies is applicable to the user identity of the query; and in response to finding a match, sending, by the corporate directory, the security policy to the security gateway.

3. The method of claim 2, wherein the user identity of the query comprises at least one of the first user identity and the second user identity.

4. The method of claim 2, wherein the matching the user identity of the query against the plurality of security policies comprises:

mapping, by the security policy, network parameters of one of the plurality of security policies to the user identity of the query; and determining whether there is a match between the user identity of the query and the user identity in the security policy.

5. The method of claim 1, wherein at least one of the plurality of security policies comprises a network traffic policy.

6. The method of claim 5, wherein the network traffic policy comprises one or more of the following:

packet modification control for the application session;

traffic shaping control;

application session access control indicating whether the user identity of the query is denied or allowed to continue to the application session; and a bandwidth control.

7. The method of claim 6, wherein the packet modification control for the application session comprises one or more of the following:

performing network address translation to the application session;

performing port address translation to the application session using a pre-determined port number;

performing content substitution, if the application session is an Hypertext Transfer Protocol (HTTP) session and if a Universal Resource Locator (URL) in data packets of the application session matches a predetermined URL;

performing filename substitution, if the application session is a file transfer session and if a filename matching a pre-determined filename is found in data packets of the application session; and inserting a cookie for the user of the user identity, if the application session is an HTTP session.

8. The method of claim 1, further comprising generating a security report concerning the application of the security policy to the application session.

9. A system, comprising:

a corporate directory comprising a plurality of security policies; and a security gateway, wherein the security gateway:

determines a first user identity and a second user identity from a data packet for an application session, the determining comprising:

inspecting the data packet for the application session and storing a host identity and an application session time in an application session record;

determining from the data packet for the application session a user identity and storing the user identity in the application session record;

determining a second user identity by matching an access session record of an access session accessed during the application session that comprises the second user identity, a second host identity, and an access session time, wherein the second host identity, and the access session time match the host identity and the application session time of the application session record;

storing the second user identity in the application session record;

obtains a security policy for the application session, the security policy based on the first user identity or the second user identity; and applies the security policy to the application session.

10. The system of claim 9, wherein the security gateway obtains a security policy for the application session comprises:

querying, by the security gateway, the corporate directory, the query including a user identity;

matching, by the corporate directory, the user identity of the query against the plurality of security policies to determine whether one of the plurality of security policies is applicable to the user identity of the query; and in response to finding a match, sending, by the corporate directory, the security policy to the security gateway.

11. The system of claim 10, wherein the user identity of the query comprises at least one of the first user identity and the second user identity.

12. The system of claim 10, wherein the matching the user identity of the query against the plurality of security policies comprises:

mapping, by one of the plurality of security policies, network parameters of the security policy to the user identity of the query; and determining whether there is a match between the user identity of the query and the user identity in the security policy.

13. The system of claim 9, wherein at least one of the plurality of security policies comprises a network traffic policy.

14. The system of claim 13, wherein the network traffic policy comprises one or more of the following:

packet modification control for the application session;

traffic shaping control;

application session access control indicating whether the user identity of the query is denied or allowed to continue to the application session; and a bandwidth control.

15. The system of claim 14, wherein the packet modification control for the application session comprises one or more of the following:

performing network address translation to the application session;

performing port address translation to the application session using a pre-determined port number;

performing content substitution, if the application session is an Hypertext Transfer Protocol (HTTP) session and if a Universal Resource Locator (URL) in data packets of the application session matches a predetermined URL;

performing filename substitution, if the application session is a file transfer session and if a filename matching a pre-determined filename is found in data packets of the application session; and inserting a cookie for the user of the user identity, if the application session is an HTTP session.

16. The system of claim 9, wherein the security gateway further generates a security report concerning the application of the security policy to the application session.

17. A non-transitory computer readable storage medium having computer readable program code embodied there-with for routing data packets of an application session, the computer readable program code configured to:

determine, by a security gateway, a first user identity and a second user identity from a data packet for an application session, the determining comprising:

inspecting, by the security gateway, the data packet for the application session and storing a host identity and an application session time in an application session record;

determining, by the security gateway, from the data packet for the application session a user identity and storing the user identity in the application session record;

determining, by the security gateway, a second user identity by matching an access session record of an access session accessed during the application session that comprises the second user identity, a second host identity, and an access session time, wherein the second host identity, and the access session time match the host identity and the application session time of the application session record;

storing the second user identity in the application session record;

obtain, by the security gateway, a security policy for the application session based on the first user identity or the second user identity; and apply the security policy to the application session by the security gateway.

\* \* \* \* \*